United States Patent
Braica

(10) Patent No.: US 7,068,852 B2
(45) Date of Patent: Jun. 27, 2006

(54) EDGE DETECTION AND SHARPENING PROCESS FOR AN IMAGE

(75) Inventor: Philip Braica, North Andover, MA (US)

(73) Assignee: Zoran Corporation, Sunnyvale, CA (US)

( * ) Notice: Subject to any disclaimer, the term of this patent is extended or adjusted under 35 U.S.C. 154(b) by 684 days.

(21) Appl. No.: 09/767,809

(22) Filed: Jan. 23, 2001

(65) Prior Publication Data

US 2002/0097439 A1 Jul. 25, 2002

(51) Int. Cl.
*G06K 9/40* (2006.01)

(52) U.S. Cl. ...................... 382/266; 382/275

(58) Field of Classification Search ................ 382/199, 382/266, 229, 275, 286, 269

See application file for complete search history.

(56) References Cited

U.S. PATENT DOCUMENTS

| 5,392,137 | A | * | 2/1995 | Okubo | 382/266 |
| 5,454,052 | A | * | 9/1995 | Kojima | 382/233 |
| 6,463,175 | B1 | * | 10/2002 | Lee | 382/190 |
| 6,600,832 | B1 | * | 7/2003 | Nakayama et al. | 382/199 |

* cited by examiner

*Primary Examiner*—Phuoc Tran
(74) *Attorney, Agent, or Firm*—Lahive & Cockfield, LLP

(57) ABSTRACT

A method and device for sharpening detected edges in an image to compensate for a corruption that occurs during the scanning and printing processes. Edges are enhanced by increasing the contrast between two sides of an edge region according to the amount of distortion in the image signal at that location. Each pixel in the image is analyzed in the context of neighboring pixels in the image to determine the presence of an edge and the degree of sharpening required. A filter is applied to adjust the intensity value of pixels in an edge region to correct for distortion and to emphasize the edge. The resulting final image contains sharpened edges with little effect on the smooth transition regions of the image.

42 Claims, 8 Drawing Sheets

EDGE DETECTION AND SHARPENING PROCESS FOR AN IMAGE

BACKGROUND OF THE INVENTION

This invention relates to image enhancement during image processing. More particularly, the present invention relates to a method and an apparatus for sharpening edges of an image.

Monochromatic imaging systems seek to provide sharp edges and good background separation. When copying, printing or reproducing a document or image using a monochromatic imaging system, it is usually desirable to smooth photographic regions and to sharpen text regions. Text is sharpened by accentuating a contrast between a bordering dark region of text and an adjacent light background. Most imaging systems process images by first separating photographic regions from text regions, by means of a process called auto-separation, and then performing separate enhancement algorithms on the text regions and the photographic regions that have been identified by the auto-separation.

In processing black and white images (i.e. "monochromatic images"), systems treat image data as an array of discrete gray level pixels ("picture elements"). Each pixel is associated with a position in the image and an 8-bit digital value that encodes an intensity value in the range from 0 to 255. Each intensity value represents a gray level of the monochromatic image, ranging from absolute black (0) to absolute white (255). Alternately, the image data can be represented as a 12-bit digital value, comprising 4096 possible intensity values, ranging from 0 (black) to 4095 (white). In color images, the color data for the image may also be encoded in intensity values for the pixels. However with color images, each pixel is encoded by three intensity values, ranging from 0 to 255, or from 0 to 4095, which combine to define an output color for the pixel.

When a scanning device scans an image to capture image data, the scanning device corrupts the image and produces a blurring effect at edges within the image. An "edge" is an interface or boundary between two distinct regions in the image, such black text and a lighter background next to the text. This blurring effect, known as "scanner fringe", occurs due to the scanner's inability to optically isolate one pixel in the image at a time. This effect is illustrated in FIG. 1, which shows a typical scan measurement for a single pixel. A measurement in intensity of a high-intensity pixel 6 "ripples"to areas 7, 8 surrounding the pixel. When the scanner attempts to measure the intensity of a pixel in the image, neighboring pixels influence and affect the measurement. As a result, there is not a sharp transition between regions of low intensity pixels and regions of high intensity pixels. Rather, there is a fuzzy and blurred transition. For example, a low intensity pixel that borders a region of high intensity appears to the scanner to have a higher intensity, due to the influence of neighboring pixels in the high intensity region.

A second problem arises when the image is printed on a print medium with a half-tone printer. The half-tone printer operates in a binary mode, where the printer either prints a dot at a pixel position or leaves the pixel position blank. As such, the grey scale intensity values (which may range for instance from 0 to 255) must be mapped to one of two values. One of the values corresponds to a value for printing a dot and the other value is for not printing a dot. To effect this mapping, a print threshold is typically used. If the measured intensity level of a pixel is less than the print threshold, the output intensity value of the pixel is converted to 0 (absolute black) and the printer places a dot at the pixel position in the output image. If the measured intensity value of the pixel is greater than the print threshold, the output intensity value is converted to 255 (absolute white), and no dot is printed at the pixel location.

Error diffusion is a technique commonly used during this half-tone printing process for reducing error and accurately reproducing an average intensity level for the image. Error diffusion examines each pixel, determines an error value for the pixel and forwards the error to a selected collection of neighboring pixels in accordance with a weighting scheme. The error is the difference between the gray level (0–255) pixel value of the input digital image and the output intensity value (either 255 or 0) of what is printed. In this manner, the error resulting from the conversion is diffused to surrounding pixels, and the average intensity (the gray level) of the original image is maintained in the converted image.

Although error diffusion may help to decrease image corruption during half-tone printing, the printer still corrupts the image at the edges of the image. Edges become blurred as the printer attempts to match the gray level at a transition between a region of low intensity pixels and a region of high intensity pixels, such as the border between text and a lighter background, as commonly found at edges of an image. The error diffuser may diffuse error to a light side of an edge region, and place ink where no dot should be placed.

SUMMARY OF THE INVENTION

The present invention addresses the above-described problems through an improved method and device for sharpening edges in an image. The invention corrects for a distortion of the image signal at an edge that occurs during scanning and printing of the image. This is accomplished by applying a sharpening filter to detected edges of an image only. The filter detects the edges of an image and sharpens the edges according to the amount of distortion in the image signal. Unlike the classical approach, this filter operates on the fly, without an auto separation process.

Rather than classifying regions of an image as text or photo, the invention scans across the whole image on a pixel by pixel basis, and finds areas of high contrast that define an edge region. These regions include text printed on light backgrounds and photo details that are blurred by the scanner. The filter changes the gray response levels of the image signal in a way tuned to the print engine so that details and borders are sharper. Edges are enhanced by altering the manner in which a halftone print engine places ink at an edge of a printed image. Sharpening accentuates the difference between the two sides of an edge region. This invention improves both photo and text quality by only adjusting a small percentage of the image data. Smooth transition areas in photos are unaffected, but edges of objects within a photo are enhanced.

According to one embodiment, the invention manipulates the image signal in an edge region to increase the intensity level of output pixels on the light side of the transition and to decrease the intensity level of output pixels on the dark side of the transition. This effect increases contrast in an edge region and prevent the printer from placing ink on the light side of the transition.

According to another embodiment, the invention manipulates the image signal in an edge region to increase contrast and provide detail to the edge. This is accomplished by applying a both a positive and a negative gain to the image signal in both regions that border an edge. While the portion of dark pixels that directly border the edge are darkened, a portion of the pixels in the dark region that are farther from the edge are lightened. In addition, the portion of light pixels that directly border the edge are lightened, and the portion of the pixels in the dark region that are farther from the edge are darkened. In this embodiment, the edge is further emphasized by providing greater contrast and detail to the edge region.

According to another embodiment, the invention provides a method of enhancing the edges of an image in order to compensate for distortion that occurs during scanning of the image.

According to yet another embodiment, the invention provides a method of enhancing the edges of an image in order to compensate for distortion that occurs during printing of the image.

BRIEF DESCRIPTION OF THE DRAWINGS

An illustrative embodiment of the present invention will be described below relative to the following drawings.

DETAILED DESCRIPTION OF THE INVENTION

The illustrative embodiment of the present invention provides a method and device for sharpening edges of an image during image processing. The illustrative embodiment will be described below relative to an implementation in a scan-to-print system for generating a copy of an original image. Nevertheless, those skilled in the art will appreciate that the present invention may also be implemented on other types of image forming systems, such as a fax machine, a personal computer or a photocopier.

The illustrative embodiment enhances the quality of a printed image by sharpening the edges of the image. The present invention allows a user to adjust the degree of sharpening according to the amount of distortion in the image. The present invention operates in real time, to improve image quality as image data is processed by an imaging system.

Figure 2:
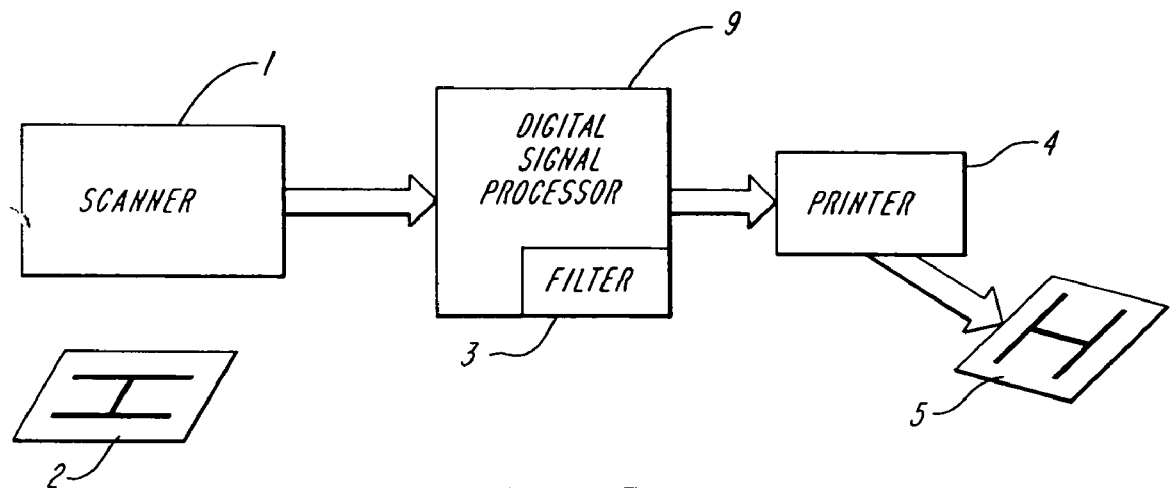
FIG. 2 is a diagram of a scan-to-print system suitable for practicing the illustrative embodiment of the present invention.
Figure 1:
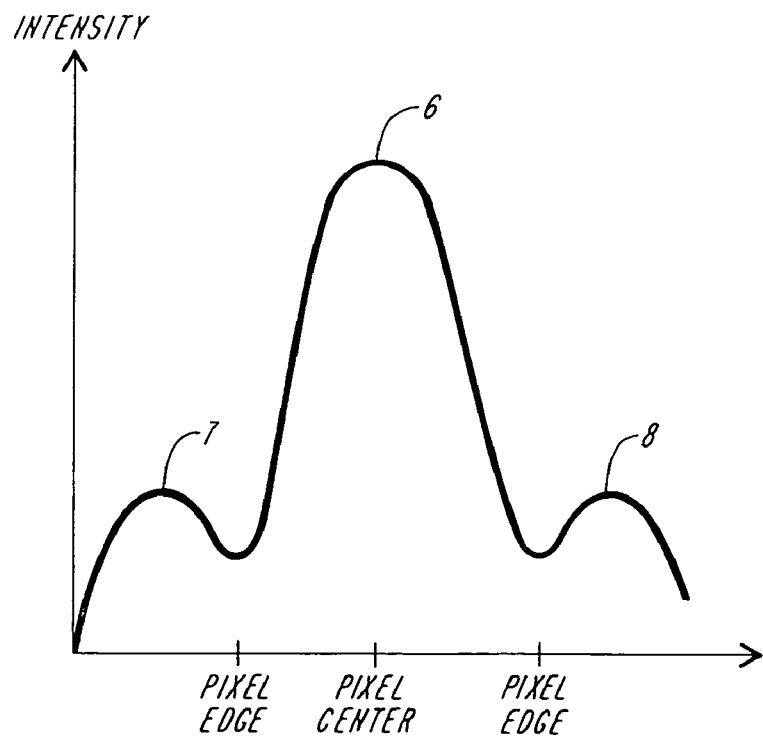
FIG. 1 is a graph of pixel intensity versus position for an isolated pixel illustrating the effect of "scanner fringe" in a conventional system.

FIG. 2 illustrates a scan-to-print image forming system 9 suitable for practicing the illustrative embodiment of the present invention. An image-capturing device, such as a scanner 1, scans an original image 2 and converts image data to an electronic signal. The signal is transmitted to the signal processor 3, which processes the image signal. The image signal is then sent to the printer 4, which produces a copy 5 of the original image on a print medium. An image forming system includes image development and transfer systems comprising an assemblage of operatively associated image forming elements for capturing image data related to an input image, generating a latent image corresponding to the input image, depositing a latent image onto a receiving member, developing the image, and then transferring the developed image onto a print medium.

Figure 3A:
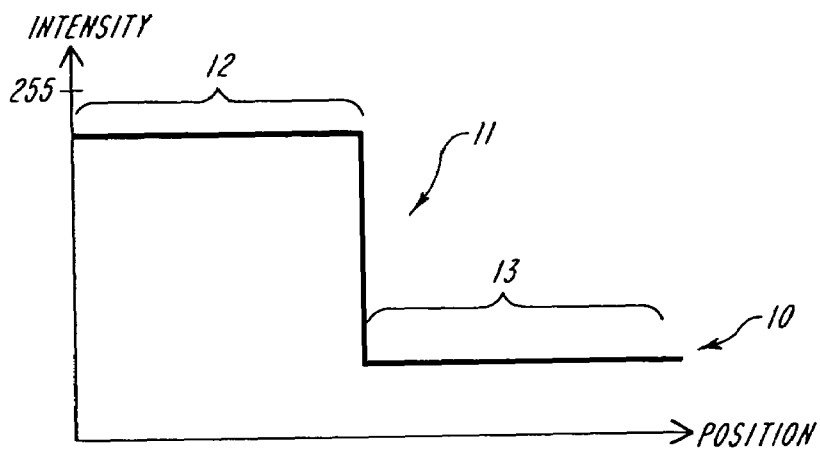
FIG. 3A is a graph of pixel intensity versus position for input image data at an edge region.
Figure 3B:
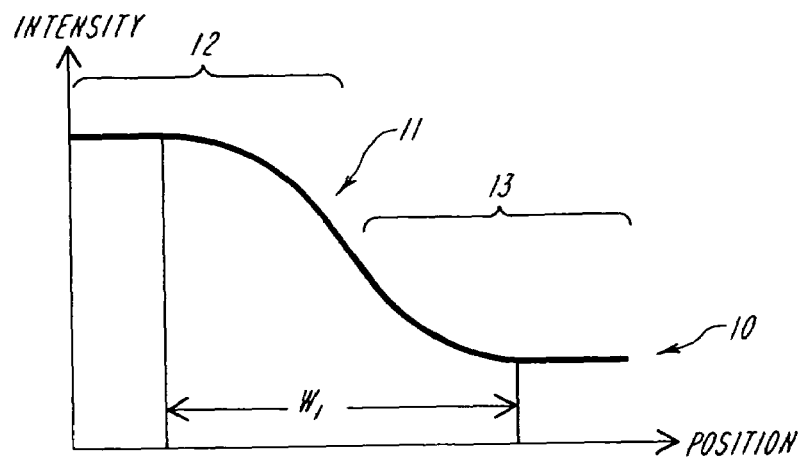
FIG. 3B is a graph of pixel intensity versus position for image data of FIG. 3A that is corrupted by a scanner at an edge region.
Figure 3C:
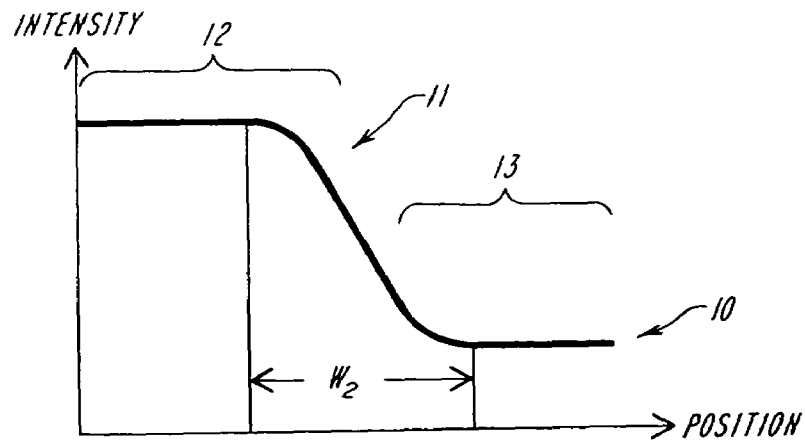
FIG. 3C is a graph of pixel intensity versus position for image data of FIG. 3A that is corrupted by the printer at an edge region.

FIGS. 3A, 3B, and 3C illustrate the two distortions of an image signal. FIG. 3A is a graph of a typical input data signal 10 at an edge 11. A sharp transition exists between a region of high intensity pixels 12 and a region of low intensity pixels 13 in at an edge in an image. FIG. 3B shows the corruption of the edge that occurs in the image signal 10 during the scan process. Rather than a sharp transition at the edge, as shown in FIG. 3A, the data signal 10 from the scanner undergoes a more gradual transition at an edge 11. The scanner 1 tends to merge the intensity levels of the two regions, rather than distinguish two discrete intensity levels. The width of the distortion $W_1$ is two pixels wide, such that the distortion extends one pixel on either side of the edge 11. FIG. 3C shows a second similar distortion that occurs during the printing process. The printed output from the printer 4 also merges the two regions on either side of the edge 11 as the error from the half-tone printer 4 is carried forward to an edge region by an error diffuser in the printer 4. The width of the printer distortion $W_2$ is one pixel wide. The combined effect of the two distortions on the image signal is a fuzzy edge and an indistinct transition between the two intensity regions of the image.

In order to correct the distortion that is illustrated in FIGS. 3B and 3C, a filter, contained within the signal processor 3 is applied to the image signal during image processing. By manipulating the signal before the error diffusion process, the filter essentially performs the inverse of the corruption on the image signal.

The filter may be applied either one dimensionally or two dimensionally, as necessary. However, for most images and character sets, the filter will only necessitate a horizontal application in order to provide acceptable results. A horizontal application of the filter sharpens non-horizontal (i.e. vertical) edges of the image. A vertical application of the filter, from top to bottom, is also possible and sharpens non-vertical (i.e. horizontal) edges of the image.

Figure 4A:
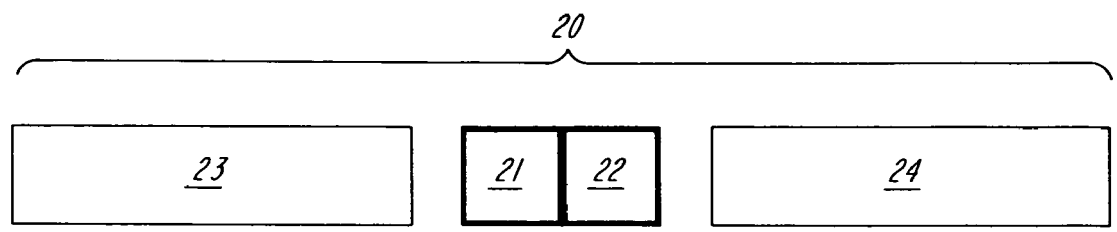
FIG. 4A is one embodiment of a filter pixel window for a horizontal implementation.

The filter detects edges by analyzing each pixel in the image in the context of the surrounding image area. As illustrated in FIG. 4A, the filter first creates a pixel window for every pair of adjacent pixels in the image in order to detect edges. The pixel window 20 for a pair of pixels 21, 22 being processed includes a left pixel 21, a right pixel 22, a left context 23, and a right context 24. This configuration is applied in horizontal scanning and filtering.

Figure 4B:
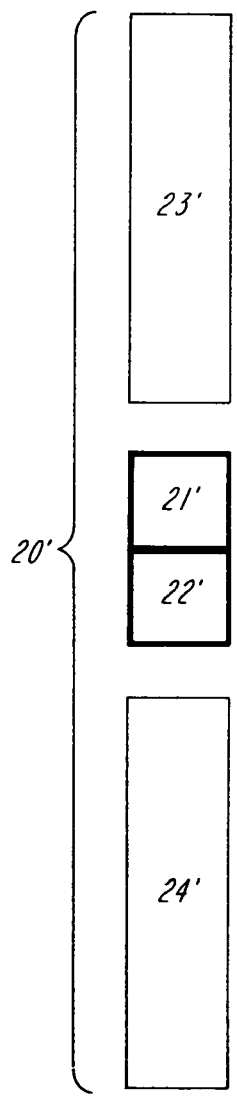
FIG. 4B is a second embodiment of the filter pixel window for a vertical implementation.

FIG. 4B shows an alternate pixel window configuration that is used in vertical scanning to sharpen horizontal edges. In this embodiment, the pixels being processed are one on top of the other. This pixel window 20' includes the top pixel 21', and the bottom pixel 22', a top context 23' and a bottom context 24'.

Figure 5A:
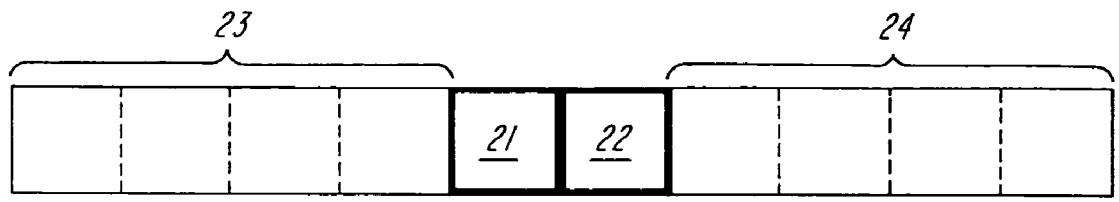
FIG. 5A illustrates one arrangement for pixel window contexts.
Figure 5B:
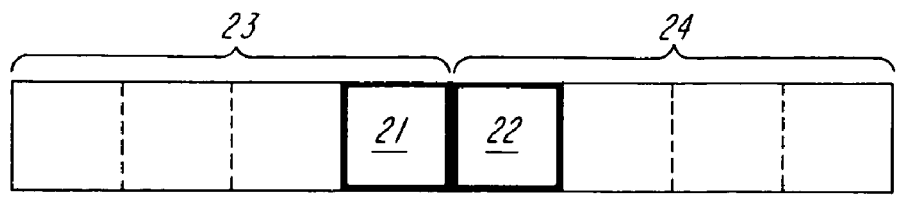
FIG. 5B illustrates a second arrangement for pixel window contexts.

In one embodiment, shown in FIG. 5A, the left context 23 and the right context 24 are four pixels wide, and are contiguous with the left pixel 21 and the right pixel 22, respectively. In an alternate embodiment, shown in FIG. 5B, the left context 23 overlaps and includes the left pixel 21, and the right context 24 overlaps and includes the right pixel 22 . The size of the surrounding contexts, as well as the distance in pixels between the contexts and the pixels is dependent on the individual scanner or printer that is in use. However, in the preferred embodiment, the left, right, top and bottom contexts are four pixels wide and contiguous with the processed pixel pair in order to provide accurate compensation for the edge corruption.

Figure 6:
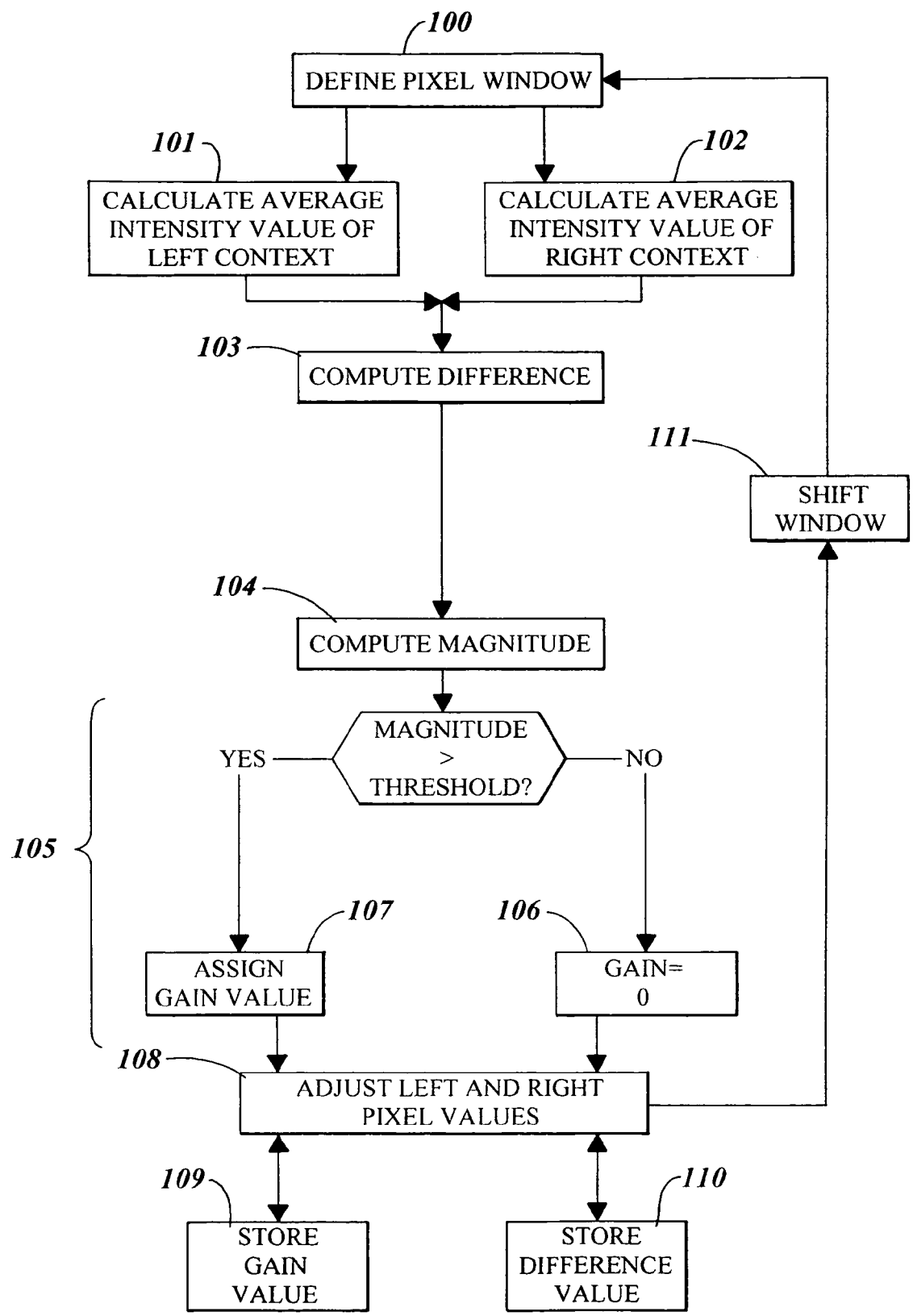
FIG. 6 is a block diagram illustrating a filtering process for a horizontal application of the filter.

FIG. 6 demonstrates the filtering process for a horizontal implementation of the filter. After defining the pixel window for the processed pixel pair (step 100), the filter detects whether the pixel pair form part of an edge in the image by calculating the average intensity value of the left context (step 101 ) and the average intensity value of the right context (step 102). The average intensity values are computed by measuring the intensity of each pixel within the context, finding the sum of these intensities, and dividing by the number of pixels in the context. The filter then computes the difference between the average intensity value of the left context and the average intensity value of the right context (step 103). The filter squares the difference value to create a positive magnitude value (step 104). When an edge exists in the image, there is a considerable disparity between the average intensity of the left context and the average intensity of the right context. The magnitude value is compared to a threshold value to determine whether an edge exists or not (step 105). If the difference between the left context and the right context is too low to be an edge region, a gain value is set to zero (step 106), and no adjustment of the pixel values is made. If, however, an edge exists at that location in the image, an appropriate gain value is assigned, depending on the degree of sharpening required (step 107). The step of assigning a gain value will be explained in further detail below. The filter stores the gain value (step 109) and the difference value (110) for use in subsequent calculations.

In a typical sharpening process, a difference between the two contexts that spans about 60 percent of the range of pixel values (0–255) indicates that an edge is present. For example, if a left and right pixel straddle a transition, and the left pixel is part of a dark region and the right pixel is part of a light region, the difference between the two intensity values of the left and right context is a relatively high number. The average intensity value of pixels in a dark region is usually 50 or less, and the average intensity value of pixels in a light region is typically 200or more. Thus, a difference between the average intensity values in a pixel window of about 150or more indicates the presence of an edge in the image.

On the other hand, a smooth transition in intensity over a region has a smaller difference value. The filter recognizes that no edge is present and, therefore, does not manipulate the output signal.

When the filter detects an edge, it adjusts the intensity of the processed pixels to compensate for the expected distortion of the image at that edge (step 108). In the illustrative embodiment, the intensity of each pixel is increased or decreased, according to the following formulas:

$$X_{left}=X_{left}+(gain*difference)- \\ (last\_computed\_gain*last\_computed\_difference) \quad \text{i)}$$

and $$X_{right}=X_{right}+(gain*difference)+ \\ (last\_computed\_gain*last\_computed\_difference) \quad \text{ii)}$$

The filter adjusts the intensity value of each pixel of the pixel pair ($X_{left}$ and $X_{right}$) so that pixels in the light region of the edge are further lightened and pixels in the dark region of the edge are further darkened. For the left pixel ("$X_{left}$"), the intensity value is adjusted by adding the product of the gain value ("gain") and the difference value ("difference") corresponding to the currently processed pixel window to the measured intensity value of the pixel. The filter then subtracts the product of the stored gain value ("last_computed_gain") and the stored difference value ("last_computed_difference") for the pixel pair that was processed directly before the current pixel pair. These values are initially set as zero. For the right pixel, the intensity value is adjusted in a reciprocal fashion. The filter modifies the right pixel value ($X_{right}$") by subtracting the product of the gain value ("gain") and the difference value ("difference") and then adding the product of the stored difference value ("last_computed_difference") and the stored gain value ("last_computed_gain") from the previously processed pixel pair. In this manner, the average pixel intensity value at an edge is maintained, while the difference between the light and dark pixels is intensified.

The filter then shifts the pixel window (step 111) by one pixel in order to process the next pixel pair, and adjust the output intensities, if necessary. In the case of horizontal filtering, the pixel window may be shifted from left to right. The right pixel of the pixel window becomes the new left pixel, the left pixel becomes a part of the left context, and the left and right contexts are adjusted accordingly. The filter continues to perform the same filtering process illustrated in FIG. 6 for the new pixel pair, using the stored gain value and the stored difference value from the previous pixel pair. In the case of vertical filtering, the pixel window is shifted from the top of the page to the bottom of the page. In this embodiment, the bottom pixel becomes the top pixel, the top pixel becomes part of the top context and the top and bottom contexts are shifted accordingly. In many instances, each pixel that is part of an edge region will be adjusted twice: the first time as the right pixel, and the second time as the left pixel. When shifting, the filter will read only the newest pixel that is added to the pixel pair, which is the rightmost pixel of the right context in the case of horizontal filtering, and use the stored intensity values of the rest of the pixel window. Therefore, unmodified values are always used when computing the average intensity values.

Figure 7A:
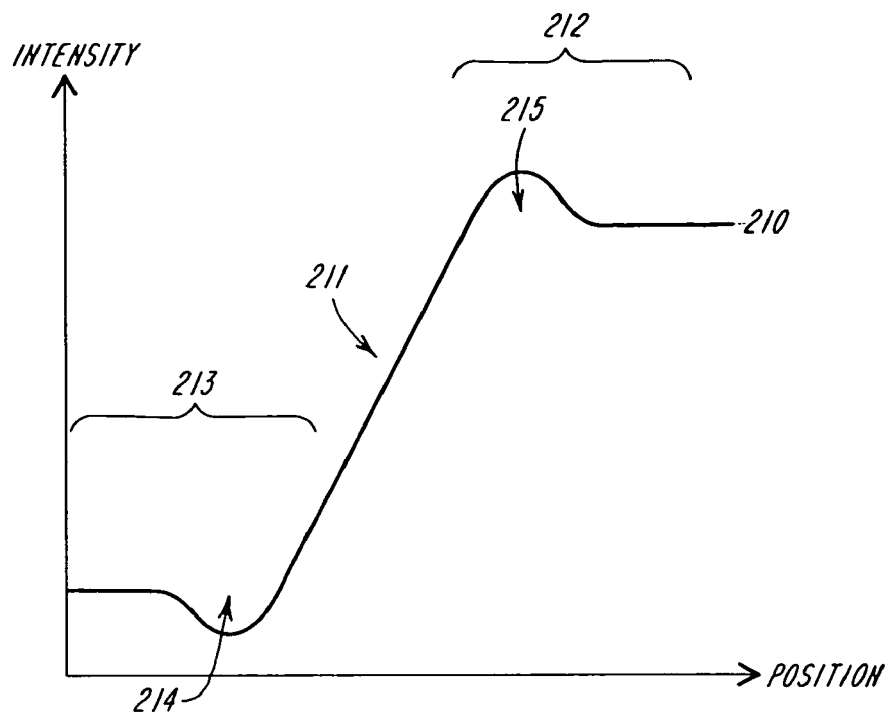
FIG. 7A is a graph of the image signal in an edge region after application of the filter in one embodiment of the present invention.

The threshold value and the gain values are adjustable by the user, according to the desired degree of filtering. A first filter response, illustrated in FIG. 7A, utilizes one threshold value in determining the gain value. When the filter detects an edge 211 (the magnitude value is greater than the threshold value), a negative gain value is assigned in the formula to adjust the pixel outputs (steps 107 and 108). In this first filter response, the filter applies a negative gain 214 to the image signal 210 in the low intensity (dark) side 213 of the edge 211 , and a positive gain 215 to the image signal 210 in the high intensity (light) side 212 of the edge 211 . The negative gain 214 decreases the intensity of the pixels in the low intensity region of the edge, while the positive gain 215 increases the intensity of the pixels in the high intensity region of the edge. In a preferred embodiment, the threshold for assigning a gain value is when the difference is greater than 140 (the magnitude is greater than 19600). The gain value is set in the range of 0 to −1. In a preferred embodiment, the gain value assigned in Equations i) and ii) when an edge is detected is −0.75 for this first filter response.

Figure 7B:
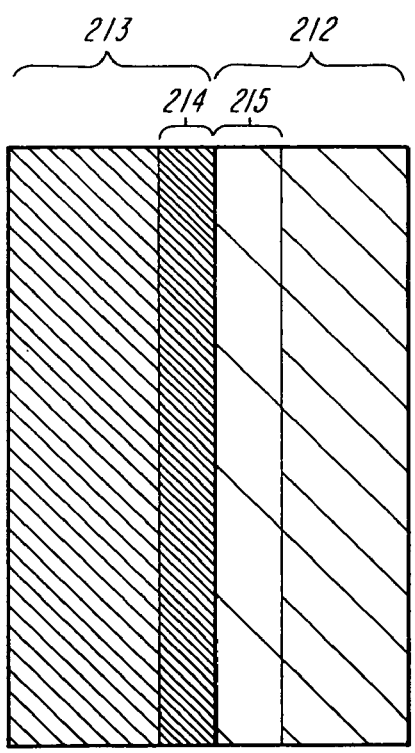
FIG. 7B shows a detail of an edge to which the filter of the embodiment depicted in FIG. 7A has been applied.

FIG. 7B illustrates a detail of an edge 211 to which this filter response has been applied. The application of this filter response darkens one portion 214 of the edge in the region of low intensity pixels 213 while simultaneously lightening 215 an adjacent portion of the edge that is in the region of high intensity pixels 212 . This increases the contrast at the edge between the two distinct regions, while maintaining a substantially constant average intensity level for the image. In this manner, the filter clarifies the fuzzy transition in the signal at this point. When the signal is error diffused, the half-tone printer will tend to place dots on one side of the transition, and prevents ink from being placed in the light region of the edge.

Figure 8A:
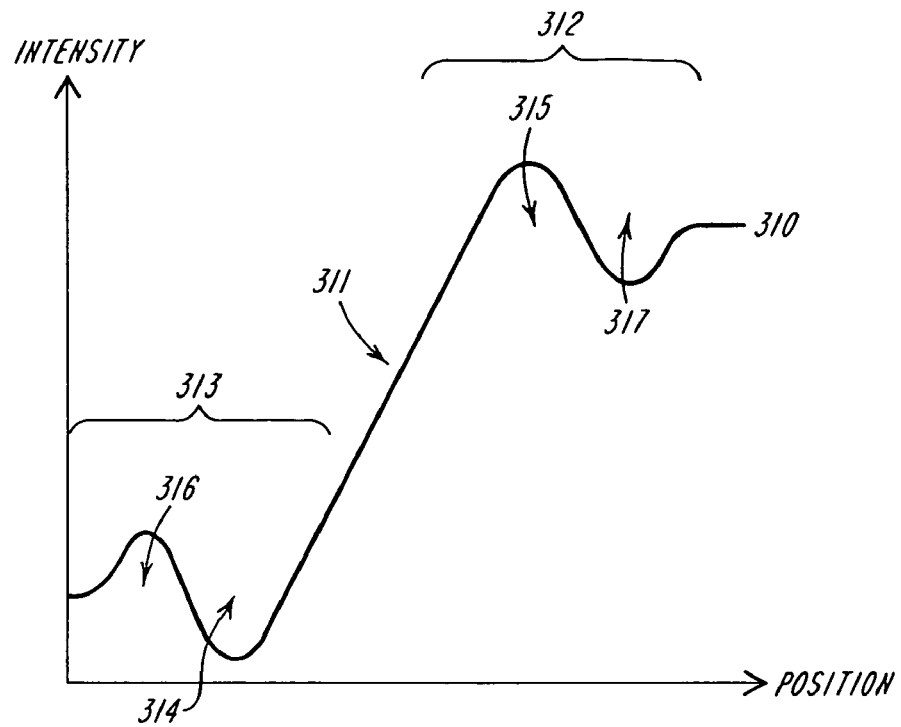
FIG. 8A is a graph of the image signal in an edge region after application of the filter in an alternate embodiment of the invention.

FIG. 8A shows an alternate filter response. This second response provides added detail and further contrast to the edge region by using two different threshold values when assigning a gain value in steps 105, 106 and 107 of FIG. 6. FIG. 8B is a flow chart illustrating the step of assigning a gain value in this response. In this response, a positive gain value, between 0.25 and 0.75 is assigned if the magnitude is greater than a first threshold value but less than a second threshold value. In this case, the first threshold is usually 40–50 percent of the range of the pixel values, and the second threshold is usually 60 percent of the range of the pixel values. A suitable first threshold value is about 10,500 ($[256*40\%]^2$), and a suitable second threshold value is about 23,600 ($[256*60\%]^2$). If the magnitude is greater than or equal to the second threshold value, the filter assigns a negative gain value between 0 and −1. When applying the formula in step 108, a first negative gain 314 similar to the negative gain 214 of FIGS. 7B and 7B is applied to the region of low intensity that immediately borders the edge 311. A first positive gain 316 is also applied to slightly increase the intensity of the low-intensity pixels that are in an intermediate zone between the edge and the principal low intensity region of the image (i.e. the low intensity region that does not directly border the edge). On the high intensity side of the edge, a second positive gain 315 , similar to the positive gain 215 of FIGS. 7A and 7B, serves to increase the intensity of pixels in the high intensity region that directly border the edge. A second negative gain 317 serves to slightly decrease the intensity of pixels in the high intensity region that are in an intermediate zone between the edge and the principal high intensity region of the image.

Figure 8C:
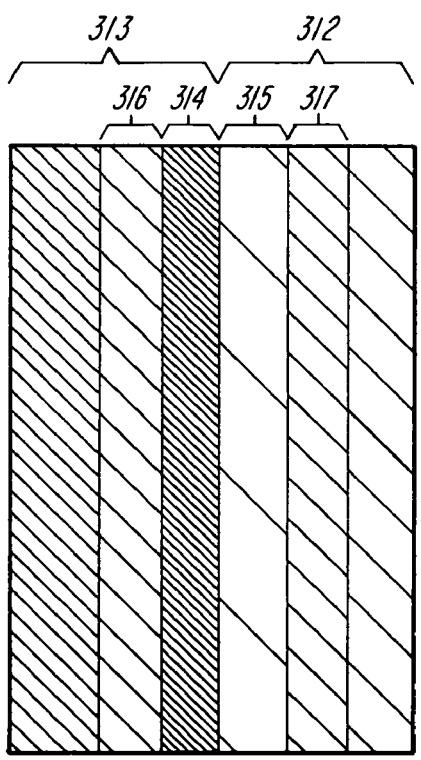
FIG. 8C shows detail of an edge to which the filter illustrated in FIG. 8A has been applied.
Figure 8B:
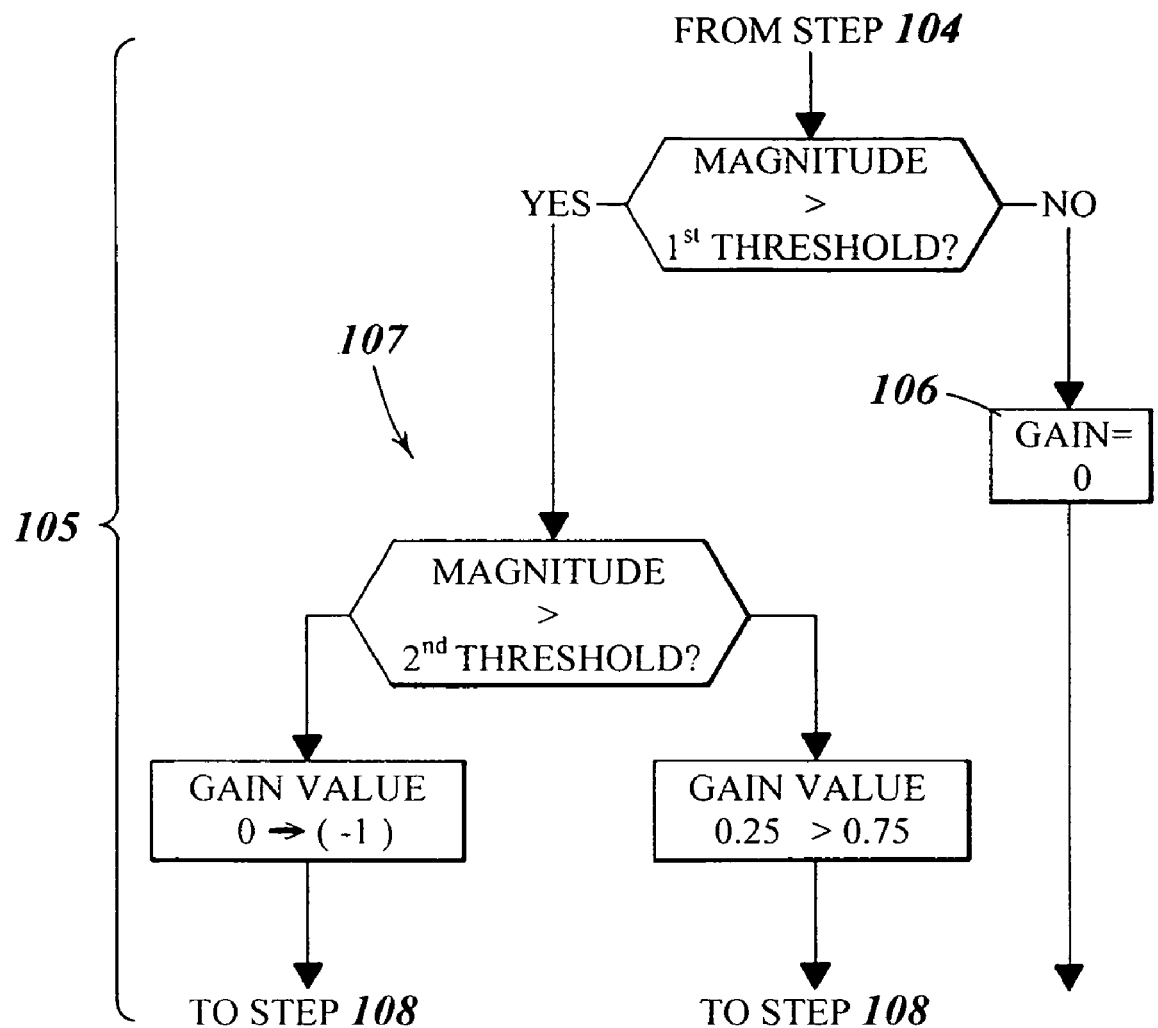
FIG. 8B is a block diagram detailing the step of assigning a gain value for the embodiment of FIG. 8A.

The effect of the second filter response at an edge is shown in FIG. 8C. This enhancement to the edge provides greater detail and heightened contrast to an edge region. The added detail emphasizes the edge, and further highlights the contrast between the two regions in the image while maintaining an average intensity level on both sides of the edge. In addition to clarifying a fuzzy transition, the filter accentuates an edge portion, thereby enhancing overall image quality. The second filter response regulates the signal, so that the half-tone print engine will cluster dots on the appropriate darker side of the transition, and leave the immediately bordering lighter side of the transition white.

The filter is flexible according to the desired amount of filtering, and may be tuned to a particular printer and scanner combination. In addition, the filter may be modified so as to compensate for distortion from the scanner only, or to compensate for distortion from the printer only. The assigned gain values, and the threshold values for assigning the gain values are adjustable so as to provide a specific response. In addition, the contexts in the pixel window may be modified to different sizes and shapes. For example, a printer that is unable to handle a large number of overly sharpened transitions quickly may require a larger context size. This prevents the edge filter from being activated to adjust the pixel outputs too frequently. The filter may be tuned through a variety of different settings, and an appropriate combination of settings may be realized by one of ordinary skill in the art through routine experimentation.

While the invention has been described for processing monochrome images, it is recognized that the filter is also capable of sharpening color images in an analogous manner. By running the filter on the image's luminance channel, edges of color images are sharpened as well. Alternatively, the filter runs on the individual output color planes and sharpens accordingly.

While the invention has been described according to particular embodiment, it will be recognized by one of ordinary skill in the art that modifications and alterations may be made without departing from the spirit and scope of the invention. The specification and drawing are intended to be exemplary, rather than restrictive. Therefore, the scope of the invention is to be determined by reference to the appended claims.

What is claimed is:

1. A method of compensating for distortion at an edge of an image during image processing, said method comprising:
    detecting the edge in the image; and
    sharpening the detected edge, wherein the degree of sharpening is directly proportional to a degree of distortion in the image.

2. A method according to claim 1, wherein the step of detecting an edge in the image includes:
    defining a first context and a second context for two adjacent pixels in the image, wherein said two adjacent pixels comprise a first pixel and a second pixel, and wherein said first context comprises a set of pixels located immediately adjacent to said first pixel in a first direction, and said second context comprises a set of pixels located immediately adjacent to the second pixel in a second direction;
    measuring an average intensity value of the first context and an average intensity value of the second context;
    computing a difference value by subtracting the average intensity value of the first context from the average intensity value of the second context;
    determining whether the first and second pixel comprise an edge by examining the difference value.

3. A method according to claim 2, wherein the step of determining whether the first and second pixel comprise an edge includes:
    establishing a first threshold value and a second threshold value, wherein the second threshold value is greater than or equal to the first threshold value;
    calculating a magnitude value by taking the square of the difference value;
    comparing the magnitude value to the first threshold value and the second threshold value;
    assigning a gain value based upon the magnitude value.

4. A method according to claim 3, wherein the gain value is set as zero if the magnitude value is less than both the first and second threshold level, the gain value is set as a positive number if the magnitude value is between the first threshold value and the second threshold value, and the gain value is set as a negative number if the magnitude value is greater than the second threshold value.

5. A method according to claim 4, wherein the step of sharpening includes adjusting the value of the first pixel and the second pixel in opposite direction, wherein
the first pixel is adjusted by adding to the first pixel value the product of the gain value multiplied by the difference value, and subsequently subtracting the product of a previous gain value and a previous difference value for a pixel pair that precedes the first pixel in the first direction; and
the second pixel is adjusted by subtracting from the second pixel value the product of the gain value multiplied by the difference value, and subsequently adding the product of the previous gain value and the previous difference value.

6. A method according to claim 3 wherein the first context and the second context are four pixels wide.

7. A method according to claim 3 wherein the first context overlaps and includes the first pixel and the second context overlaps and includes the second pixel.

8. A method according to claim 3 wherein the first context is contiguous with the first context and the second context is contiguous with the second pixel.

9. A method according to claim 3, wherein:
the first pixel is a left pixel;
the second pixel is a right pixel;
the first direction is to the left of the two adjacent pixels;
the second direction is to the right of the two adjacent pixels.

10. A method according to claim 3, wherein:
the first pixel is a top pixel;
the second pixel is a bottom pixel;
the first direction is above the two adjacent pixels;
the second direction is below the two adjacent pixels.

11. An electronic device comprising:
a scanner for scanning an original image and converting the image into a digital image signal comprised of pixels having an intensity value that ranges from a minimum intensity to a maximum intensity;
a printer for printing a copy of the original image onto a print medium by converting the image signal to a half-tone image using an error diffuser to sequentially process the pixels;
a digital signal processor for processing the image signal after scanning and before printing, wherein said digital signal processor includes a filter for sharpening edges of the image in order to compensate for distortion of the edges that occurs during scanning and printing of the image.

12. An electronic device according to claim 11, wherein the filter includes:
means for detecting an edge in the image, wherein the edge is characterized by a sharp contrast in the image signal between pixels of low intensity and pixels of high intensity;
means for sharpening the edge by adjusting the image signal according to the degree of distortion in the image signal;
wherein said means for detecting and means for sharpening are implemented through a computer executable program stored in the digital signal processor.

13. An electronic device according to claim 12, wherein the filter adjusts the image signal by adding a negative gain to the pixels of low intensity that are adjacent to the edge and a positive gain to the pixels of high intensity that are adjacent to the edge, in order to increase the contrast between the pixels of low intensity and the pixels of high intensity while maintaining an substantially average intensity value for the image.

14. An electronic device according to claim 12, wherein the filter adjusts the image signal by adding a first positive gain and a first negative gain to the pixels of low intensity that are adjacent to the edge and a second positive gain and a second negative gain to the pixels of high intensity that are adjacent to the edge in order to increase the contrast and provide detail to the edge while maintaining an average intensity value for the image.

15. An electronic device according to claim 14, wherein:
the first negative gain is applied to decrease intensity in a first area of pixels within the pixels of low intensity, said first area comprising the pixels of low intensity that directly border the pixels of high intensity;
the first positive gain is applied to slightly increase intensity in a second area of pixels within the pixels of low intensity, said second area comprising pixels located between a non-edge area of the image and said first area;
the second positive gain is applied to increase intensity in a third area, said third area comprising pixels of high intensity that directly border the first area;
the second negative gain is applied to slightly decrease intensity in a fourth area, said fourth area comprising pixels of high intensity located between a non-edge area of the image and the third area.

16. An electronic device according to claim 12, wherein the filter forces the error diffuser in an edge region to place a dot in the area of high intensity only and prevents the placement of a dot in the area of low intensity.

17. The electronic device of claim 12, wherein the electronic device is a facsimile machine.

18. The electronic device of claim 12, wherein the electronic device is a photocopier.

19. The method of claim 1, wherein the step of sharpening the detected edge comprises the step of:
applying a filter to the image at the detected edge, wherein said filter adjusts the intensity of pixel values near the detected edge in order to compensate for a blurring effect that occurs at the detected edge during scanning of the image.

20. A method according to claim 19, wherein the filter also compensates for a distortion that occurs during printing of the image.

21. A method according to claim 19, wherein the step of applying a filter comprises:
applying a negative gain to the area of low intensity that is adjacent to the edge; and
applying a positive gain to the area of high intensity that is adjacent to the edge;
wherein said filter has an effect of increasing contrast between the area of low intensity and the area of high intensity while maintaining a constant average intensity level.

22. A method according to claim 19, wherein the step of applying the filter comprises:
applying a first negative gain and a first positive gain to the area of low intensity that is adjacent the edge; and
applying a second negative gain and a second positive gain to the area of high intensity that is adjacent the edge;
wherein said filter has an effect of increasing contrast at the edge and providing detail to the edge while maintaining a constant average intensity level.

23. A method of sharpening edges according to claim 22, wherein:
the first negative gain is applied to decrease intensity in a first area within the area of low intensity, said first area being the area of low intensity that directly borders the area of high intensity;
the first positive gain is applied to slightly increase intensity in a second area that is within the area of low intensity, said second area being located between a non-edge area of the image and said first area;
the second positive gain is applied to increase intensity in a third area, said third area being the area of high intensity that directly borders the first area;
the second negative gain is applied to slightly decrease intensity in a fourth area, said fourth area being located within the area of high intensity between a non-edge area of the image and the third area.

24. The method of claim 1, wherein the step of sharpening the detected edge comprises:
applying a filter to the image at the detected edge, whereby said filter adjusts the intensity of pixel values near the edge to compensate for error that occurs during printing of the image.

25. The method according to claim 24, wherein the step of applying a filter comprises:
applying a negative gain to the area of low intensity that is adjacent to the edge; and
applying a positive gain to the area of high intensity that is adjacent to the edge;
wherein said filter has an effect of increasing the contrast between the area of low intensity and the area of high intensity while maintaining a constant average intensity level.

26. A method according to claim 24, wherein the step of applying the filter comprises:
applying a first negative gain and a first positive gain to the area of low intensity that is adjacent the edge; and
applying a second negative gain and a second positive gain to the area of high intensity that is adjacent the edge;
wherein said filter has an effect of increasing the contrast at the edge and providing detail to the edge while maintaining a substantially constant average intensity level.

27. A method of sharpening edges according to claim 26, wherein:
the first negative gain is applied to decrease intensity in a first area within the area of low intensity, said first area being the area of low intensity that directly borders the area of high intensity;
the first positive gain is applied to slightly increase intensity in a second area that is within the area of low intensity, said second area being located between a non-edge area of the image and said first area;
the second positive gain is applied to increase intensity in a third area, said third area being the area of high intensity that directly borders the first area;
the second negative gain is applied to slightly decrease intensity in a fourth area, said fourth area being located within the area of high intensity between a non-edge area of the image and the third area.

28. The method of claim 1, further comprising the step of:
defining a window of pixels within the image, said window comprising a first pixel, a first set of context pixels located immediately adjacent to said first pixel in a first direction, a second pixel located immediately adjacent to said first pixel in a second direction, and a second set of context pixels located immediately adjacent to the second pixel in the second direction,
wherein the edge is detected within the window of pixels.

29. The method of claim 28, further comprising the step of shifting the window in a linear direction in order to detect and sharpen additional edges of the image.

30. The method of claim 29, wherein the sharpening is applied only at detected edges of the image, while smooth transition areas of the image remain unaffected.

31. The method of claim 1, wherein the method is executed on an electronic device comprising:
a scanner for scanning an original image and converting the image into a digital image signal comprised of pixels having an intensity value that ranges from a minimum intensity to a maximum intensity;
a printer for printing a copy of the original image onto a print medium by converting the image signal to a half-tone image using an error diffuser to sequentially process the pixels;
a digital signal processor for processing the image signal after scanning and before printing, wherein said digital signal processor includes a filter for sharpening edges of the image in order to compensate for distortion of the edges that occurs during scanning and printing of the image.

32. The method of claim 31, herein the filter forces the error diffuser in an edge region to place a dot in the area of high intensity only and prevents the placement of a dot in the area of low intensity.

33. The method of claim 31, wherein the electronic device is a facsimile machine.

34. The method of claim 31, wherein the electronic device is a photocopier.

35. An electronic device for executing the method of claim 1.

36. A method of compensating for distortion at an edge of an image during image processing, said method comprising:
measuring an average intensity value of a first context of pixels adjacent to a first pixel in the image and an average intensity value of a second context of pixels adjacent to a second pixel in the image, wherein the first pixel and the second pixel are adjacent to each other;
computing a difference value by subtracting the average intensity value of the first context from the average intensity value of the second context;
determining whether the first pixel and the second pixel comprise an edge by examining the difference value; and
when an edge is detected, sharpening the detected edge.

37. The method of claim 36, wherein the degree of sharpening is directly proportional to a degree of distortion in the image.

38. A method of compensating for distortion at an edge of an image during image processing, said method comprising:
detecting the edge in the image; and
sharpening the detected edge by adjusting an intensity of pixel values near the edge, wherein the degree of sharpening is directly proportional to a degree of distortion in the image.

39. The method of claim 38, wherein the step of sharpening comprises increasing an intensity of pixels on a first side of the edge and decreasing an intensity of pixels on a second side of the edge.

40. A method according to claim 38, wherein the step of sharpening comprises:
　applying a negative gain to the area of low intensity that is adjacent to the edge; and
　applying a positive gain to the area of high intensity that is adjacent to the edge;
　wherein said filter has an effect of increasing contrast between the area of low intensity and the area of high intensity while maintaining a constant average intensity level.

41. A method according to claim 38, wherein the step of sharpening comprises:
　applying a first negative gain and a first positive gain to the area of low intensity that is adjacent the edge; and
　applying a second negative gain and a second positive gain to the area of high intensity that is adjacent the edge;
　wherein said filter has an effect of increasing contrast at the edge and providing detail to the edge while maintaining a constant average intensity level.

42. A method of sharpening edges according to claim 41, wherein:
　the first negative gain is applied to decrease intensity in a first area within the area of low intensity, said first area being the area of low intensity that directly borders the area of high intensity;
　the first positive gain is applied to slightly increase intensity in a second area that is within the area of low intensity, said second area being located between a non-edge area of the image and said first area;
　the second positive gain is applied to increase intensity in a third area, said third area being the area of high intensity that directly borders the first area;
　the second negative gain is applied to slightly decrease intensity in a fourth area, said fourth area being located within the area of high intensity between a non-edge area of the image and the third area.

\* \* \* \* \*